US 8,536,257 B2

(12) United States Patent
Shah et al.

(10) Patent No.: US 8,536,257 B2
(45) Date of Patent: Sep. 17, 2013

(54) DEFOAMING COALESCENTS

(75) Inventors: Shailesh C. Shah, Dresher, PA (US); Daniel Herzog, Northampton, PA (US); Peter Bene, Köln (DE); Michael S. Wiggins, Landsdale, PA (US)

(73) Assignee: Cognis IP Management GmbH, Duesseldorf (DE)

( * ) Notice: Subject to any disclaimer, the term of this patent is extended or adjusted under 35 U.S.C. 154(b) by 270 days.

(21) Appl. No.: 12/919,243

(22) PCT Filed: Feb. 18, 2009

(86) PCT No.: PCT/EP2009/001123
§ 371 (c)(1),
(2), (4) Date: Aug. 25, 2010

(87) PCT Pub. No.: WO2009/106252
PCT Pub. Date: Sep. 3, 2009

(65) Prior Publication Data
US 2011/0003923 A1    Jan. 6, 2011

Related U.S. Application Data

(60) Provisional application No. 61/031,925, filed on Feb. 27, 2008.

(51) Int. Cl.
*C08C 1/08*     (2006.01)
*C08K 5/10*     (2006.01)

(52) U.S. Cl.
USPC ........... 524/287; 524/315; 524/391; 524/366; 524/376; 524/317; 524/308; 524/122; 524/335

(58) Field of Classification Search
USPC ............... 524/287, 315, 391, 366, 376, 317, 524/308, 122, 335
See application file for complete search history.

(56) References Cited

U.S. PATENT DOCUMENTS

| | | | |
|---|---|---|---|
| 5,827,453 A | 10/1998 | Gross et al. | |
| 5,877,245 A | 3/1999 | Wiggins et al. | |
| 5,895,605 A | 4/1999 | Gross et al. | |
| 6,350,787 B1 | 2/2002 | Wiggins et al. | |
| 6,465,605 B2 | 10/2002 | Breindel et al. | |
| 6,583,185 B2 | 6/2003 | Wiggins et al. | |
| 6,969,734 B1 * | 11/2005 | Pressley et al. | 524/115 |
| 2007/0043159 A1 * | 2/2007 | Bardman et al. | 524/501 |
| 2007/0093579 A1 | 4/2007 | Van de Mark et al. | |

FOREIGN PATENT DOCUMENTS

| | | | |
|---|---|---|---|
| EP | 1568740 | | 8/2005 |
| EP | 1 568 740 | * | 4/2010 |
| EP | 1 568 740 B1 | * | 4/2010 |
| WO | 95/11937 | | 5/1995 |

OTHER PUBLICATIONS

Functional products FOAMASTER® NXZ Product Sheet, Cognis www.cognis.com 2009, 2 pgs.

* cited by examiner

*Primary Examiner* — Robert D. Harlan
(74) *Attorney, Agent, or Firm* — Servilla Whitney LLC

(57) ABSTRACT

A defoaming coalescent for a water-based composition including a coalescent carrier; and one or more defoamer-active components is provided. A method for making a defoaming coalescent including the steps of: providing a coalescent carrier and one or more defoamer-active components; and combining the carrier and defoamer-active components is also provided. A water-based composition including a polymer latex or a polymer dispersion; and a defoaming coalescent is also provided.

14 Claims, No Drawings

DEFOAMING COALESCENTS

FIELD OF THE INVENTION

The invention relates generally to defoaming coalescents, and more particularly, to defoaming coalescents for water-based compositions.

STATE OF THE ART

Mineral oils are conventionally used as carrier fluids in defoaming compositions. Many common defoamers contain 60%-95% mineral oil. Mineral oils are presently undesirable because they are derived from fossil fuels, and portions of the oils are volatile organic compounds (VOCs), which contribute to fogging on interior windows upon the application of interior paints containing the defoamers.

The performance of water-based latex compositions used in paints, adhesives, and binders for non-woven materials improves when combined with coalescing solvents and plasticizers, but many of the additives are volatile and are harmful to the environment.

There remains a need for components that can effectively replace traditional VOC-contributing compounds. There also remains a need for improved VOC-free defoamers and VOC-free coalescents for water-based compositions.

DESCRIPTION OF THE INVENTION

Briefly described, according to an aspect of the invention, a defoaming coalescent for a water-based composition includes (a) a coalescent carrier; and (b) one or more defoamer-active components.

According to another aspect of the invention, a method for making a defoaming coalescent includes the steps of: (a) providing a coalescent carrier; (b) providing one or more defoamer-active components; and (c) combining (a) and (b).

According to another aspect of the invention, a water-based composition includes: (a) a polymer latex or a polymer dispersion; and (b) a defoaming coalescent, which includes: (i) a coalescent carrier; and (ii) one or more defoamer-active components.

As used herein, the terms "comprises", "comprising", "includes", "including", "has", "having", or any other variation thereof, mean that other elements or components may be included. For example, a process, method, article, or apparatus that comprises a list of elements is not necessarily limited to the expressly listed elements, but may include other elements inherent, or not expressly listed, to such process, method, article, or apparatus. In addition, unless expressly stated to the contrary, the term "or" refers to an inclusive "or" and not to an exclusive "or". For example, the condition A "or" B is satisfied by any one of the following: A is true (included) and B is false (omitted); A is false (omitted) and B is true (included); and both A and B are true (both included).

The terms "a" or "an" as used herein are to describe elements and components of the invention. This is done for convenience to the reader and to provide a general sense of the invention. The use of "a" or "an" should be understood to include one or at least one. In addition, the singular also includes the plural, unless indicated to the contrary. For example, reference to a composition containing "a compound" includes at least one or more compounds.

As used herein, the term "coalescent(s)" means slow-evaporating or non-evaporating solvents that fuse latex particles into a continuous film by themselves, or, when in a coating formulation, under ambient conditions, fuse latex particles into a continuous film.

As used herein, the term "defoaming" means the reduction of foam in an aqueous medium.

It has been found that the defoaming coalescents according to the invention improve the film formation properties of latex-based formulations. According to an aspect of the invention, the coalescent carrier provides coalescing properties, but contributes very small amounts or does not contribute at all to VOCs, as determined by the U.S. Environmental Protection Agency (EPA) and/or European Union (EU) regulations. When the coalescent carrier is combined with defoaming-active components according to the invention, the defoaming coalescent provides both coalescing and defoaming properties.

Advantageously, the defoaming coalescents according to the invention provide coalescing and defoaming properties when added to a water-based composition, including latex paints, printing inks, adhesives, and binders for non-woven materials. In addition, the use of a coalescent carrier according to an aspect of the invention provides a suitable partial or complete substitute for mineral oil and other VOC-based carriers, which is a benefit for the environment. In addition, the defoaming coalescents according to an aspect of the invention are advantageously based on fats and oils from renewable resources.

According to an aspect of the invention, the coalescent carriers include, but are not limited to, fatty acid esters, for example, a monoester derived from a long-chain fatty acid of a $C_{18}$ fatty acid, propylene glycol monoesters, and fatty acid methyl esters, which are suitable for replacing petroleum-based coalescents which contribute to VOCs. According to another aspect of the invention, the coalescent carriers may be petrochemical-based, and may be selected from the group consisting of a petrochemical-based ether, a petrochemical-based ether ester, a petrochemical-based ester, and mixtures thereof. The petrochemical-based coalescent carrier may be selected from the group consisting of glycol ethers, glycol ether esters, benzoate esters, butyrate esters, and mixtures thereof.

Suitable carriers include, for example, LOXANOL® EFC 100, which has less than 1% VOC, LOXANOL® EFC 200, which has less than 2% VOC (based on EPA Method 24), and LOXANOL® EFC 300, which is a zero-VOC coalescent, according to 1999/13/EU or 2004/42/EU. LOXANOL® EFC 100 is a high-purity propylene glycol monooleate, LOXANOL® EFC 200 is a high-purity propylene glycol monoester of $C_{18}$ fatty acids, and LOXANOL® EFC 300 is a linear fatty acid ester, all of which are available from Cognis Corporation.

Other suitable carriers include, but are not limited to, TEXAPRINT SJEH, a soybean fatty acid 2-ethylhexyl ester, TEXAPRINT SKEH, a coconut fatty acid 2-ethylhexyl ester, TEXAPRINT SLIP, a lauric fatty acid isopropyl ester, and EDENOR® ME 12-18, a palm kernel oil fatty acid methyl ester, all of which are available from Cognis Corporation.

The hydrophobic defoamer-active components according to an aspect of the invention include, but are not limited to, hydrophobized silica, polyethylene waxes, polyamide waxes, silicone oils, modified silicone oils, and mixtures thereof. According to another aspect of the invention, the defoamer-active components include branched and/or block copolymers as described in U.S. Pat. Nos. 6,583,185, 6,465,605, 6,350,787, 5,895,605, 5,877,245 and 5,827,453, the entire disclosures of which are hereby incorporated herein by reference.

In addition, the defoaming coalescents according to an aspect of the invention may contain auxiliaries and additives. For example, surfactants and emulsifiers may be included according to an aspect of the invention, to yield easy-to-disperse defoaming coalescents. Other conventional additives that do not materially affect the basic characteristics and efficacy of the composition may also be present. For example, a viscosity modifier may be added to reduce settling tendencies of the defoamer-active components.

The defoaming coalescents according to an aspect of the invention may be present in latex paints in amounts of from about 0.01% to about 10% by weight of the water-based composition.

Unless otherwise defined, all technical and scientific terms used herein have the same meaning commonly understood by one of ordinary skill in the art to which the invention belongs. Although methods and materials similar or equivalent to those described herein can be used in the practice or testing of the invention, suitable methods and materials are described below. The materials, methods and examples are illustrative only, and are not intended to be limiting.

EXAMPLES

Example 1

The following formulations, A to D, were prepared by first making the corresponding intermediates by heating the first part of the carrier fluid (57.33 parts) with a first part of hydrophobized silica (10.69 parts) into a stainless steel vessel and mixing until uniform. The intermediate mixtures were homogenized at 2000 psi using APV Homogenizer Model 1000-2 stage, available from Siebe Group. The final formulations from the intermediates were prepared by heating 68.02 parts of the intermediate with 30.98 parts of the corresponding carrier to 60° C., adding 1 part of the corresponding silica, and homogenizing at 2500 psi. The particle size distributions were checked for each to ascertain the samples to be comparable.

| Component | A | B | C | D |
|---|---|---|---|---|
| Intermediates | | | | |
| Mineral Oil | 57.33 | 57.33 | | |
| LOXANOL ® EFC 200 | | | 57.33 | 57.33 |
| SIPERNAT ® D10 | 10.69 | | 10.69 | |
| ZEOFLO ® TL | | 10.69 | | 10.69 |
| Final Formulations | | | | |
| Mineral Oil | 30.98 | 30.98 | | |
| LOXANOL ® EFC 200 | | | 30.98 | 30.98 |
| SIPERNAT ® D10 | 1 | | 1 | |
| ZEOFLO ® TL | | 1 | | 1 |
| Total | 100.0 | 100.0 | 100.0 | 100.0 |

In the above Example, the mineral oil used was Tufflo Naphthenic Process Oil, available from Citgo Petroleum Corporation. SIPERNAT® D10 is hydrophobized silica, available from Evonik Industries, and ZEOFLO® TL is hydrophobized silica, available from Huber Engineered Products.

The above formulations, A to D, were added in an amount of 0.5% by weight of a semi-gloss latex indoor house paint formulation. The composition of the paint is indicated below. The results are indicated in Table 1.

Semi-Gloss Latex Indoor House Paint Formulation

| Ingredient | Manufacturer | Function | Weight percent |
|---|---|---|---|
| Pigment Grind | | | |
| Propylene glycol | Shell Chemical LP | Solvent | 6.1 |
| Tamol 731 | Rohm & Haas | Pigment Dispersant | 1.3 |
| Kathon LX | Rohm & Haas | Biocide | 0.2 |
| Ti-Pure R-900 | DuPont | White Pigment | 25.2 |
| Water | | Solvent | 1.1 |
| Latex Letdown | | | |
| Water | | Solvent | 9.5 |
| Rhoplex SG-10M | Rohm & Haas | Film-forming latex resin | 45.9 |
| TEXANOL | Eastman | Coalescent | 2.3 |
| Acrysol RM-2020 | Rohm & Haas | Thickener | 0.1 |
| Acrysol RM-825 | Rohm & Haas | Thickener | 7.4 |
| Water | | Solvent | 0.5 |
| A-D | | Defoamer-coalescent | 0.5 |
| Total | | Finished Paint | 100.0 |

TABLE 1

| Example | Conc. (wt. %) | % Air | BB Time (seconds) | Compatibility | 20° Gloss | 60° Gloss | 85° Gloss |
|---|---|---|---|---|---|---|---|
| None | 0.0 | 6.2 | >300 | No defects | 42 | 76 | 94 |
| A | 0.5 | 1.5 | 55 | No defects | 25 | 62 | 90 |
| B | 0.5 | 1.6 | 49 | No defects | 24 | 64 | 89 |
| C | 0.5 | 1.7 | 48 | No defects | 34 | 71 | 91 |
| D | 0.5 | 1.9 | 127 | No defects | 35 | 72 | 92 |

% Air refers to the amount of entrained air after five minutes, which was determined by using a Red Devil Shaker (1.0-[shaken density/unshaken density]) × 100.
BB Time refers to the time (in seconds) within which all bubbles break (BB) after rolling onto a sealed paper with a ³/₈" nap paint roller (it should be understood that any time less than 300 seconds is acceptable).
Compatibility refers to the defects present in a 3 mil drawdown after drying (due to defoamer incompatibility).
20°, 60°, and 85° Gloss refers to the light reflectance of the dry film at the specified angles, as measured by a Byk-Gardner "micro-TRI-gloss" meter.

The data in Table 1 demonstrates that the defoaming coalescents, C and D, according to an aspect of the invention, provide significant reduction in the percentage of entrained air when compared to defoamer-free paint and essentially the same level of defoaming performance as the mineral oil-based defoamers (A and B). In addition, the gloss at a 20° angle, and at a 60° angle is improved for paints with defoaming coalescents, when compared to those with conventional mineral oil-based defoamers.

The following data in Table 2 demonstrates the reduction in film formation temperatures of the defoaming coalescents of Table 1.

TABLE 2

| Example | 1 | 2 | 3 | 4 | 5 | 6 | 7 |
|---|---|---|---|---|---|---|---|
| Rhoplex SG-10M Acrylic Latex* | 50 | 50 | 50 | 50 | 50 | 50 | 50 |
| TEXANOL | | 1 | 1.25 | 1 | 1 | 1 | 1 |
| A | | | | | 0.25 | | |
| B | | | | | | 0.25 | |

TABLE 2-continued

| Example | 1 | 2 | 3 | 4 | 5 | 6 | 7 |
|---|---|---|---|---|---|---|---|
| C |  |  |  |  |  | 0.25 |  |
| D |  |  |  |  |  |  | 0.25 |
| MFFT*** ° C. | 15.6 | 9.7 | 6.9 | 11.2 | 11.0 | 4.9 | 5.3 |

*Rhoplex SG-10M is an acrylic latex available from Rohm & Haas
**TEXANOL is an ester alcohol (2,2,4-trimethyl-1,3-pentandiol monoisobutyrate), available from Eastman Chemical
***Minimum Film-Forming Temperature (MFFT)

As demonstrated in Table 2, the addition of TEXANOL (Examples 2 and 3) to the acrylic latex reduces the MFFT. Surprisingly, the further addition of the defoaming coalescents (C and D) according to an aspect of the invention (Examples 6 and 7) reduces the MFFT more than the conventional coalescent TEXANOL (Example 3). The addition of mineral oil (Examples 4 and 5) had a negative effect on coalescence by raising the MFFT, which demonstrates the further benefit of the defoaming coalescents according to an aspect of the invention.

Example 2

Various defoaming coalescents, according to an aspect of the invention, were prepared and compared to a variety of commercially available fatty ester coalescents. The results are in Table 3.

Agent Formulations

Control: 84.5% Naphthenic Mineral oil, 7.5% SIPERNAT® D 17 (hydrophobic silica), 5% of a viscosity improver (a methacrylic polymer conventionally used in oil-based systems), and 3% of an emulsifier (PEG 600 Dioleate) as a comparative example.

1: 68% SYNATIVE® ME SJ (a soyamethyl ester, available from Cognis Corporation; 7.5% SIPERNAT® D 17, 21.5% of a viscosity improver (same as above), and 3% of an emulsifier (PEG 600 Dioleate), according to an aspect of the invention.

2: Same as 1, except 68% of LOXANOL® EFC 300 was used in place of SYNATIVE® ME SJ, according to an aspect of the invention.

3: Same as 2, except 68% of LOXANOL® EFC 100 was used, according to an aspect of the invention.

4: Same as 2, except 68% of LOXANOL® EFC 100/TEXAPRINT SJEH 1:1 was used according to an aspect of the invention.

5: Same as 2, except 68% of LOXANOL® EFC 100/TEXAPRINT SKEH 1:1 was used according to an aspect of the invention.

6: Same as 2, except 68% of TEXAPRINT SJEH was used according to an aspect of the invention.

7: Same as 2, except 68% of TEXAPRINT SKEH was used according to an aspect of the invention.

8: Same as 2, except 68% of TEXAPRINT SLIP was used according to an aspect of the invention.

9: Same as 2, except 68% of EDENOR® ME 12-18 was used according to an aspect of the invention.

TABLE 3

| Agent | Viscosity (in mPas) | Density | Appearance (sponge roller) | Compatibility |
|---|---|---|---|---|
| Mineral Oil-based Defoamer | 1250 | .679 | 2 | 3-4 |
| 1 | 200 | .695 | 5 | 3-4 |
| 2 | 100 | .718 | 3-4 | 3 |
| 3 | 550 | .824 | 5 | 3 |
| 4 | 310 | .768 | 4-5 | 3-4 |

TABLE 3-continued

| Agent | Viscosity (in mPas) | Density | Appearance (sponge roller) | Compatibility |
|---|---|---|---|---|
| 5 | 250 | .793 | 4 | 5 |
| 6 | 530 | .736 | 3 | 3-4 |
| 7 | 400 | .81 | 3 | 5 |
| 8 | 190 | .76 | 5 | 3-4 |
| 9 | 110 | .72 | 5 | 3-4 |

With respect to compatibility, on a scale of 1-5, 1 is poor (exhibits cratering), and 5 is very good.
With respect to appearance, on a scale of 1-5, 1 is poor (a lot of foam bubbles, and hazy film), and 5 is very good (no foam, and clear film).

In Table 3, a commercially-available naphthenic mineral-oil based standard defoamer was used as a control. It should be understood that as density increases, the amount of foam present in the formulation decreases. Compared to the commercially-available standard, the defoaming coalescents according to the invention demonstrated a comparable density, and in many cases, significantly improved density characteristics. In addition, Table 3 illustrates that the defoaming coalescents according to an aspect of the invention have similar compatibility to the mineral oil standard, and also exhibit comparable, and in many cases, improved appearance upon application with a sponge roller.

The data in Table 4 demonstrates that when a coalescent carrier is added (at 2% by weight of the Acronal 290 D) there is a reduction in MFFT in all cases with LOXANOL® EFC 300 being the best. Acronal 290 D is a styrene-acrylic latex available from BASF.

TABLE 4

| Component | A | B | C | D | E | F | G | H | I | J |
|---|---|---|---|---|---|---|---|---|---|---|
| Acronal 290 D Styrene-Acrylic Latex | 50 | 49 | 49 | 49 | 49 | 49 | 49 | 49 | 49 | 49 |
| SYNATIVE ® ME SJ |  | 1 |  |  |  |  |  |  |  |  |
| LOXANOL ® EFC 300 |  |  | 1 |  |  |  |  |  |  |  |
| LOXANOL ® EFC 100 |  |  |  | 1 | 0.5 | 0.5 |  |  |  |  |
| Texaprint SJEH |  |  |  |  | 0.5 |  | 1 |  |  |  |
| Texaprint SKEH |  |  |  |  |  | 0.5 |  | 1 |  |  |
| Texaprint SLIP |  |  |  |  |  |  |  |  | 1 |  |
| EDENOR ® ME 12-18 |  |  |  |  |  |  |  |  |  | 1 |
| MFFT ° C. | 18 | 6 | 0 | 6 | 10 | 8 | 11 | 10 | 4 | 8 |

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

The benefits, advantages, and solutions to problems have been described above with regard to specific embodiments. The benefits, advantages, and solutions to problems and any element(s) that may cause any benefit, advantage, or solution to occur or become more pronounced are not to be construed as a critical, required, or essential feature or element of any or all of the claims.

The invention claimed is:

1. A defoaming coalescent for a water-based composition, comprising:
   (a) a coalescent carrier; and
   (b) one or more defoamer-active components, wherein the coalescent carrier is present in an amount of about 50-99.9% by weight, and the one or more defoamer-active components are present in an amount of about 0.1-50% by weight.

2. The defoaming coalescent according to claim 1, wherein the coalescent carrier comprises a fatty acid ester.

3. The defoaming coalescent according to claim 1, wherein the coalescent carrier comprises a propylene glycol monoester of a fatty acid with about 8 to about 22 carbon atoms.

4. The defoaming coalescent according to claim 1, wherein the coalescent carrier comprises a fatty acid methyl ester.

5. The defoaming coalescent according to claim 1, wherein the coalescent carrier comprises a fatty acid methyl ester with about 12 to 14 carbon atoms.

6. The defoaming coalescent according to claim 1, wherein the coalescent carrier is petrochemical-based, and is selected from the group consisting of a petrochemical-based ether, a petrochemical-based ether ester, a petrochemical-based ester, and mixtures thereof.

7. The defoaming coalescent according to claim 6, wherein the petrochemical-based coalescent carrier is combined with one or more fatty acid esters.

8. The defoaming coalescent according to claim 6, wherein the petrochemical-based coalescent carrier is selected from the group consisting of glycol ethers, glycol ether esters, benzoate esters, butyrate esters, and mixtures thereof.

9. The defoaming coalescent according to claim 8, wherein the petrochemical-based coalescent carrier is combined with one or more fatty acid esters.

10. The defoaming coalescent according to claim 1, wherein the defoamer-active components are selected from the group consisting of: hydrophobized silica, polyethylene waxes, polyamide waxes, silicone oils, modified silicone oils, and mixtures thereof.

11. The defoaming coalescent according to claim 1, wherein the defoamer-active components comprises branched and/or block copolymers.

12. The defoaming coalescent according to claim 1, incorporated into a polymer latex-based or polymer dispersion-based composition.

13. A method for making a defoaming coalescent, comprising the steps of:
   (a) providing a coalescent carrier;
   (b) providing one or more defoamer-active components; and
   (c) combining (a) and (b) to provide a defoaming coalescent comprising about 50-99.9% by weight coalescent carrier and about 0.1-50% by weight one or more defoamer-active components.

14. A water-based composition, comprising:
   (a) a polymer latex or a polymer dispersion; and
   (b) a defoaming coalescent, comprising:
      (i) a coalescent carrier selected from the group consisting of fatty acid esters, propylene glycol monoesters and fatty acid methyl esters; and
      (ii) one or more defoamer-active components selected from the group consisting of hydrophobized silica, polyethylene waxes, polyamide waxes, and mixtures thereof.

* * * * *